United States Patent
Yang

(10) Patent No.: US 6,459,906 B1
(45) Date of Patent: Oct. 1, 2002

(54) METHOD AND SYSTEM FOR DISPLAYING RECEIVED MESSAGES OF PORTABLE TELEVISION (TV) PHONE

(75) Inventor: Jae-Duk Yang, Taegu Kwangyokshi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/473,064

(22) Filed: Dec. 27, 1999

(30) Foreign Application Priority Data

Dec. 26, 1998 (KR) .............................................. 98-59064

(51) Int. Cl.⁷ .............................. H04B 1/38; H04N 7/14
(52) U.S. Cl. ........................ 455/556; 455/566; 455/567; 348/552
(58) Field of Search ................................. 455/557, 556, 455/575, 550, 567, 566; 348/552, 14.04, 14.01, 14.02, 14.07; D14/130

(56) References Cited

U.S. PATENT DOCUMENTS

| | | | | |
|---|---|---|---|---|
| 5,920,806 A | * | 7/1999 | Gouessant | .................... 455/66 |
| 5,999,602 A | * | 12/1999 | Yang et al. | ............ 379/110.01 |
| 6,141,058 A | * | 10/2000 | Lagoni et al. | ............... 348/563 |

FOREIGN PATENT DOCUMENTS

KR           97-55875       7/1997     ............ H04B/7/26

* cited by examiner

*Primary Examiner*—Edward F. Urban
*Assistant Examiner*—Erika A. Gary
(74) *Attorney, Agent, or Firm*—Dilworth & Barrese, LLP

(57) ABSTRACT

A method of controlling an operation mode of a TV phone, where the TV phone includes a TV unit that reproduces and outputs a video signal from a selected channel. A display unit interfaces with the TV unit and displays the inputted video signal from the selected channel while in a TV mode. An MRFU receives data of a forward channel transmitted from a base station. An MSP provides a channel selection signal to the TV unit and transmits and receives voice and character signals by controlling the MRFU and generates a display control signal responsive to an incoming character message. An OSD generates a video signal corresponding to the display control signal received at an input of the OSD and provides the generated video signal to the display unit. The method of controlling the operation mode of the TV phone comprises the steps of receiving a character message transmitted from the base station through the forward channel when the video signal generated by the TV unit is displayed on a screen in said display unit during the TV mode. In addition, a video signal of the OSD corresponding to the first line in the received character message is displayed on a portion of the screen of the display unit, while the other portions of the screen display the respective portion of the video signal generated by the TV unit.

5 Claims, 3 Drawing Sheets

METHOD AND SYSTEM FOR DISPLAYING RECEIVED MESSAGES OF PORTABLE TELEVISION (TV) PHONE

BACKGROUND OF THE INVENTION

1. Field of the Invention

The present invention relates to a method and system for controlling the operation of a hand-held portable cellular telephone, and more particularly to a method for displaying a character message received from an integrally combined television (TV) and portable cellular phone (hereinafter, referred to as "TV phone") in a scrolling manner on a viewing screen thereof.

2. Description of the Related Art

In recent years, rapid and wide spread use of a portable telephone as a widespread personal communication appliance has driven development of portable phones with a variety of functions in addition to a simple conversation function. For example, portable phones have developed to include a calculator, a biorhythm checking feature, and the capability of transmitting and/or receiving images of a TV and a video camera. The term "TV phone" herein refers to wireless portable cellular phones of all types which also provide television (TV) broadcast through a display unit of the portable phone, in addition to a cordless telephone conversation feature for telecommunication.

An example of the above TV phone is disclosed in Korean Patent Application No. 1995-46026 entitled "A Combined TV Receiver and Cellular Phone" by LG Electronics Co., Ltd., filed in the Korean Industrial Property Office on Dec. 1, 1995 and published on Jul. 31, 1997 by that Office.

For reception of a TV broadcast, the portable phone is equipped with two radio frequency units therein, as disclosed in the above-mentioned Korean patent application 1995-46026. The reason for this is that a frequency bandwidth necessary for transmitting and receiving telecommunication messages (i.e., voice and data) is different from that for a TV broadcast. An operation mode of the TV phone is classified into a phone mode, a waiting mode, and a TV mode, which is also used as the waiting mode. When operating in the TV mode, the TV phone allows a user to watch and hear images and voices of the television program received on a display unit, i.e. a Thin Film Transistor (TFT) Liquid Crystal Display (LCD), and a speaker or an earphone of the portable phone.

Disadvantages arise in the prior art when the TV phone is operating in the TV mode and there is an incoming call and/or an incoming character data message. For example, the TV phone of the above-cited patent application 1995-46026 cannot process character messages received by the transmitter/receiver of the telecommunications feature when the TV phone is operating in TV mode and receiving a TV signal via the receiver of the TV. Thus, a user using the TV phone in the TV mode is not alerted to an incoming character message.

When the TV phone of patent application 1995-46026 receives an incoming voice call, it is impossible to directly switch the TV mode to the phone mode while in the TV mode. Accordingly, the user must turn off the TV phone, manually switch the TV mode to the phone mode with regard to every incoming call, and turn the phone back on. This consumes battery power and is highly inconvenient to the user.

There is therefore a need for a TV phone that rapidly and accurately informs a user of both an incoming call and an incoming character data message when viewing a TV program in the TV mode.

SUMMARY OF THE INVENTION

Therefore, an object of the invention is to provide more efficient communication of a character message received when viewing a TV program in a TV mode of a TV phone without interfering with the user's viewing of the TV program.

It is another object of the invention to provide display of where the message may be scrolled on the screen of the display unit.

It is an objective of the invention to provide a method of controlling an operation mode of a TV phone, where the TV phone includes a TV unit that reproduces and outputs a video signal from a selected channel. A display unit interfaces with the TV unit and displays the inputted video signal from the selected channel while in a TV mode. An MRFU receives data of a forward channel transmitted from a base station. An MSP provides a channel selection signal to the TV unit and transmits and receives voice and character signals by controlling the MRFU and generates a display control signal responsive to an incoming character message. An OSD generates a video signal corresponding to the display control signal received at an input of the OSD and provides the generated video signal to the display unit. The method of controlling the operation mode of the TV phone comprises the steps of receiving a character message transmitted from the base station through the forward channel when the video signal generated by the TV unit is displayed on a screen in said display unit during the TV mode. In addition, a video signal of the OSD corresponding to the first line in the received character message is displayed on a portion of the screen of the display unit, while the other portions of the screen display the respective portion of the video signal generated by the TV unit.

In accordance with another embodiment of the present invention, the method further comprises the step of scrolling up or scrolling-down the received character message in response to input of an up-scroll selecting signal or a down-scroll selecting signal generated from an up-scroll key or a down-scroll key arranged on a key pad.

In accordance with another embodiment of the present invention, the method further comprises the step of clearing the character message displayed on the screen of the display unit (the display unit thus only presenting images of the TV program on the air), when an output terminating signal is entered on the keypad.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
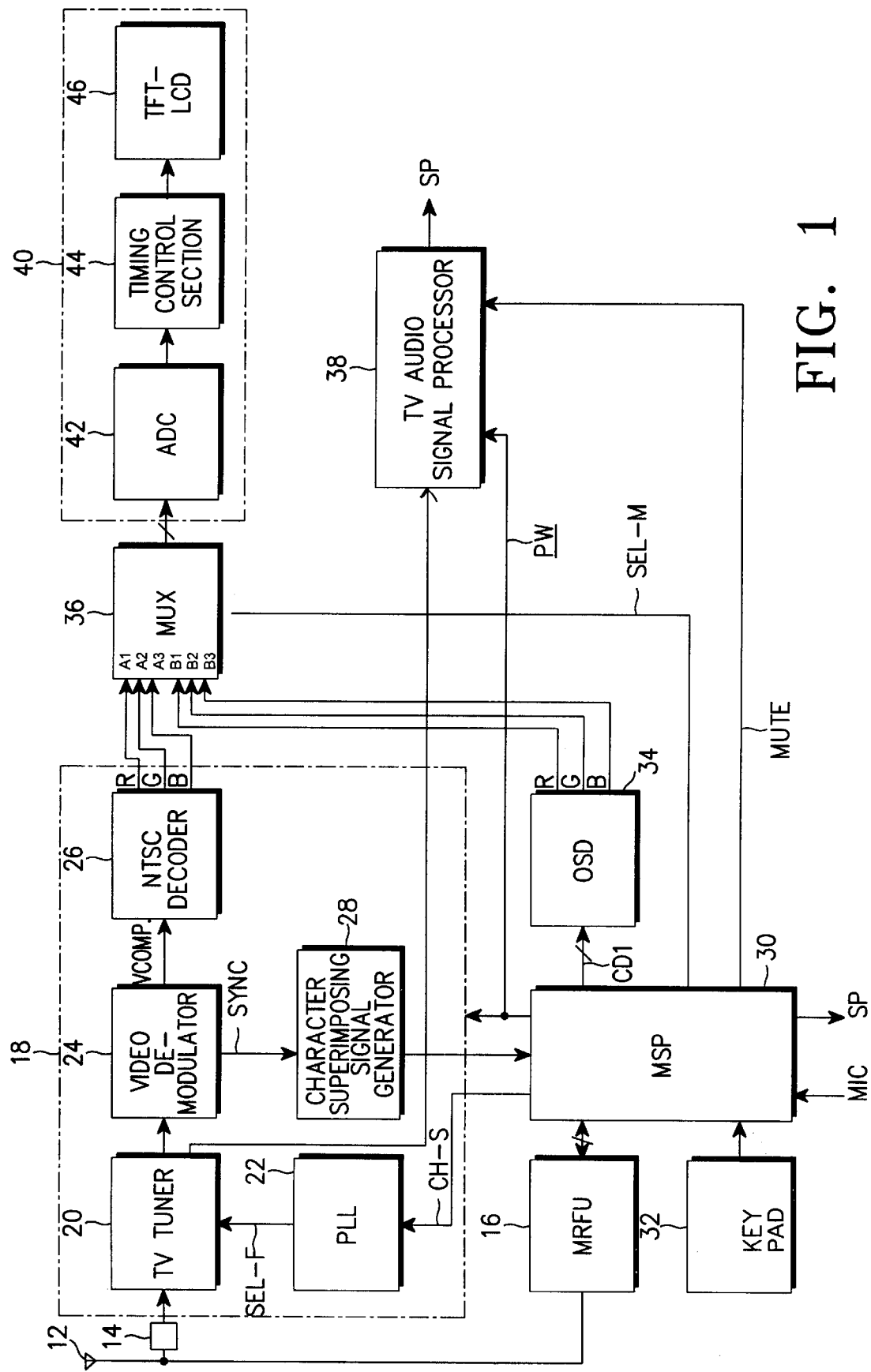
FIG. 1 is a block diagram illustrating the construction of a TV phone according to a preferred embodiment of the present invention.

Referring to FIG. 1, a block diagram illustrating the construction of a TV phone according to a preferred embodiment of the present invention is shown. In FIG. 1, a mobile radio frequency unit (MRFU) 16, mobile station processor (MSP) 30, and key pad 32 all of a portable phone module, are shown. Such circuits may be configured as in conventional portable digital cellular phones, e.g., CDMA type portable cellular phones, and such construction and operation will be apparent from the following detailed description.

Also, the TV phone includes TV unit 18, an on-screen display (OSD) 34, a multiplexer 36 (hereinafter, referred to as "MUX"), a TV audio signal processor 38, and a display unit 40. The TV unit 18 and the TV audio signal processor 38 are TV modules.

Operations of the TV phone of FIG. 1 are as follows: when the TV phone is set to a TV mode, an alarm informs the user of the incoming call. The alarm can be set to one of three modes, for example: the incoming call alarm may trigger an audio alert, it may mute the TV phone audio and switch an image onto the display of the TV phone, or it may display a call incoming message at a specific region on the TV display.

A radio-frequency, electromagnetic signal is received by an antenna 12 which converts the radio-frequency, electromagnetic signal into an electrical signal which is supplied to a radio frequency filter, i.e., a bandpass filter 14. The bandpass filter 14 is operative to pass only frequency components of a frequency bandwidth for a TV broadcast. The bandpass filter 14 generates filtered signals, which are applied to the TV unit 18.

When the TV phone is set to a TV mode, the MSP 30 supplies a power control signal PW for the TV unit 18 and the TV audio signal processor 38. The MSP 30 supplies a phase locked loop, (hereinafter, referred to as "PLL"), 20 in the TV unit 18 with a channel selecting signal inputted via the key pad 32 or a channel selecting signal CH-S for selecting a previous viewing channel. PLL 20 oscillates a tuning frequency SEL-F corresponding to the channel-selecting signal and applies the SEL-F signal to TV tuner 20. TV tuner 20 combines the filtered signal from the bandpass filter 14 and the tuning frequency SEL-F from the PLL 20 and outputs a down-converted video intermediate frequency (VIF) signal to video demodulator 24 and outputs audio intermediate frequency (AIF) signal to TV audio signal processor 38.

A video demodulator 24 coupled to the output terminal of the TV tuner 20 demodulates the video intermediate frequency (VIF) signal and outputs the resultant composite video signal Vcomp to NTSC decoder 26, (a video decoder). Video demodulator 24 also outputs a synchronizing signal SYNC of the composite video signal to a character superimposing signal generator 28. The NTSC decoder 26 decodes the composite video signal Vcomp and outputs the decoded composite video signal as color signals R, G, B to terminals A1–A3 of MUX 36.

The character superimposing signal generator 28 counts the synchronizing signal SYNC, and generates a character-superimposing signal if the counted signal value is a predetermined value. The character superimposing signal generator 28 comprises a counter that counts a horizontal synchronizing signal, a memory that stores a position value of a horizontal line, and a comparator that compares the counted signal value and the position value stored in memory. The character superimposing signal generator 28 generates a character superimposing control signal during a retrace period of the horizontal synchronizing signal if the comparator indicates the counted signal value from the counter is equal to the position value stored in memory. The character superimposing control signal is generated at regular intervals in every field or frame period.

Accordingly, the TV unit as constructed above, is activated by a power control signal from the MSP 30, and generates a video signal and an audio signal of a TV broadcast channel according to the channel selecting signal, while also generating a character superimposing control signal that is used to superimpose an incoming character message on a screen of the display unit 40 when there is an incoming call, as described further below. The generation of such a character superimposing control signal will be advantageously used when an incoming alarm indicates an incoming text message, as described further below.

MUX 36 selects the video signals R, G, and B input from the NTSC decoder 26 when a video selecting signal SEL-M output is from the MSP 30 at a "low" state. Video signals R, G, B, from NTSC decoder 26 are then applied to analog-to-digital converter (ADC) 42 of the display unit 40. The ADC 42 converts the selected video signals R, G, and B into digital signals which are output to timing control section 44. The timing control section 44, which includes a synchronizing signal generator for 20 generating a pseudo-horizontal synchronizing signal and a pseudo-vertical synchronizing signal, drives a TFT-LCD 46. An image is thus displayed on the screen of the TFT-LCD 46. In addition, the TV audio signal processor 38 processes the audio intermediate frequency (AIF) signal inputted thereto from the TV tuner 20 to reproduce an audio signal for a TV program and output the reproduced audio signal through a transducer such as a speaker.

Thus, TV unit 18, TV audio signal processor 38, and display unit 40 receive and reproduce a video signal and an audio signal for a TV program in TV mode for a channel selected via the MSP 30. During this operation, when a user depresses a channel selection key (or keys) on the key pad 32 to select a desired channel, the MSP 30 changes the channel selecting signal CH-S output to PLL 22, thus changing the tuning frequency and the output of the PLL 22, which in turn changes the channel of the TV tuner.

MRFU 16 is coupled to the antenna 12 and receives a radio-frequency signal of a transmitting/receiving frequency bandwidth for a portable phone. MRFU 16 converts a received analog signal into a digital signal for further processing or converts a digital signal into an analog signal and power-amplifies the converted signal for transmission via antenna 12. MRFU 32 comprises, for example, an RF unit combined with a baseband analog circuit of a conventional portable phone. For example, MRFU 32 can be constructed by combining a CDMA type radio transceiver unit, "BBA2.X (Q5312CDMA)" chip manufactured by QUALCOMM. Co. as a BBA circuit (for converting an analog signal into CDMA type digital data and vice versa), and an RF unit.

MSP 30 receives commands supplied from the keypad 32 and generates control signals corresponding to the commands. MSP 30 also performs a variety of operations such as analysis of a received forward channel data message, reproduction of an analog audio signal from the received data, extraction of character data from the received data and demodulating, de-interleaving, decoding, data signal processing, and vocoding of the digital signal inputted thereto from the MRFU 16. The MSP 30 also performs operations that output the reproduced analog audio signal to a speaker, and convert an analog audio signal input from a microphone (MIC) into a CDMA type digital signal for transmission to a channel through the MRFU 16. In addition, the MSP 30 informs a user watching a TV program of reception of a character message by a character message displaying routine set in an inner memory if the received forward channel data message is a character message. The MSP 30 may be, for example, an MSMXX00 series one-chip type available from QUALCOMM Co.

The OSD 34 is coupled to an output of the MSP 30. For a received character message OSD 34 generates OSD video signals corresponding to character generating control data output from the MSP 30. The OSD video signals R, G, B are output to input terminals B1–B3 of the MUX 36. As noted above, in TV mode, MUX 36 selects the video signals R, G, and B inputted to the input terminals A1–A3 when video selecting signal SEL-M output from the MSP 30 is at a "low" state.

Figure 2:
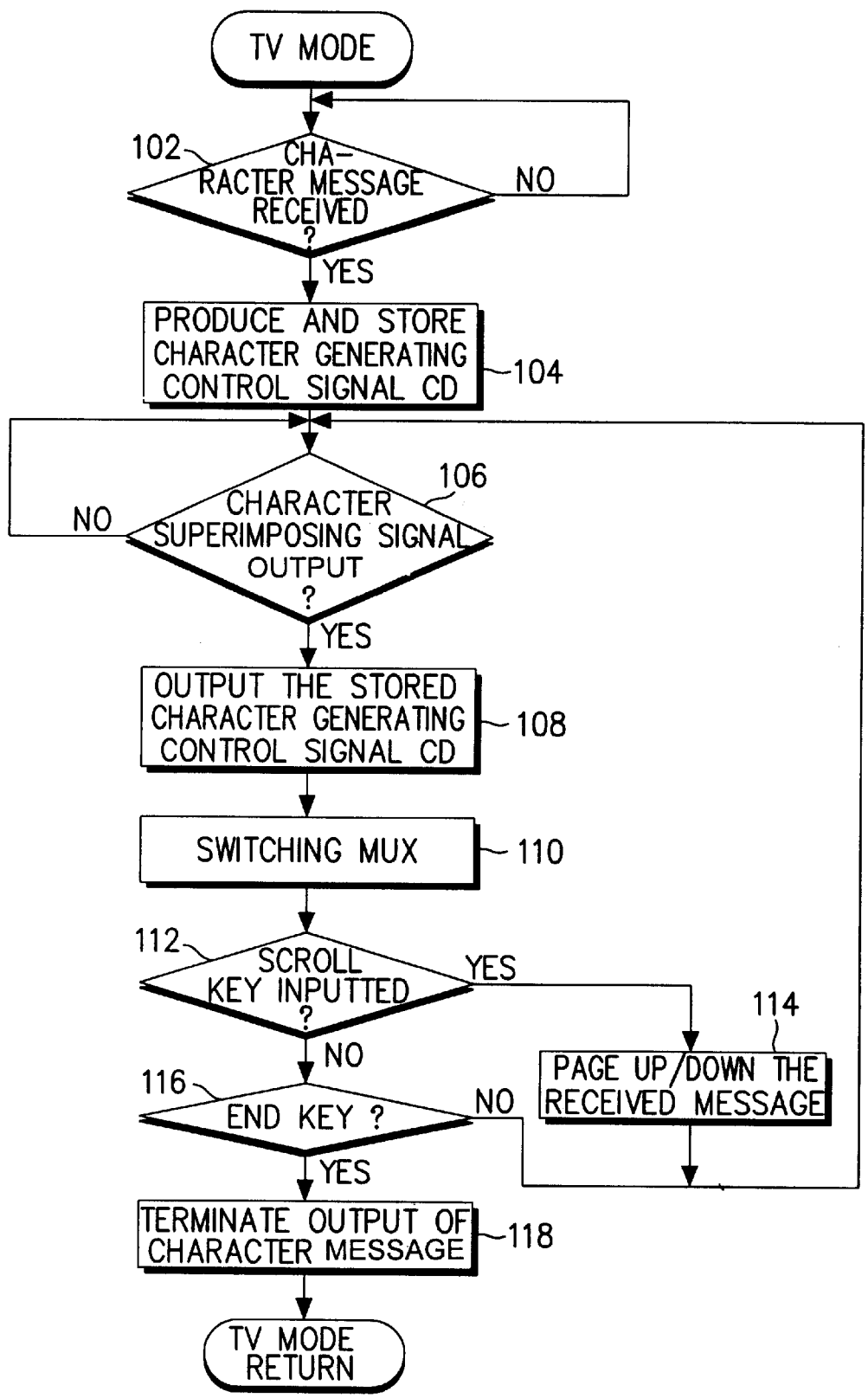
FIG. 2 is a flowchart illustrating the displaying process of the received character message of the TV phone according to a preferred embodiment of the present invention.

FIG. 2 is a flowchart illustrating the displaying process of the received character message of the TV phone according to a preferred embodiment of the present invention, in which the operation mode of the TV phone of FIG. 1 is switched from the TV mode to the phone mode upon the reception of an incoming call message, or is maintained in the TV mode. A program for the flowchart is housed in a memory block of the MSP 30 in shown in FIG. 1.

As shown in FIG. 2, the TV phone is initially in a TV mode. The MSP 30 monitors an output of the MRFU 16 and determines whether or not a character message has been received at step 102. If it is determined at step 102 that character message has not been received, the MSP 30 continues to operate in the TV mode. The term "character message" means a character message such as a SMS (short message service) presently provided by a portable phone.

If it is determined at step 102 that the MRFU 32 has received a character message, the program proceeds to step 104, where MSP 30 decodes the received character message to produce a character generating control signal CD and stores the character generating control signal CD in the MSP's 30 memory. The program then proceeds to step 106, where it is determined whether or not a character superimposing signal is outputted from the character superimposing signal generator 28. The terms "character superimposing signal" means a signal that effectively identifies a region at the bottom portion (such as a horizontal line portion) of a field or a frame, for example, as described above.

If it is determined at step 106 that the character-superimposing signal is output, the program proceeds to step 108 where the MSP 30 supplies the stored character generating control signal CD to the OSD 34. The MSP 30 then generates the video selecting signal SEL-M in a logic "high" state to switch the output of the MUX 42 (step 110).

Figure 3A:
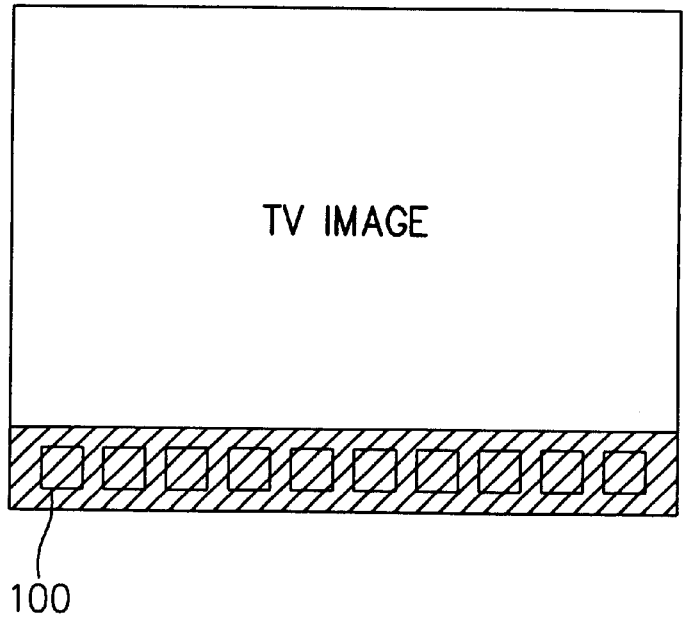
FIGS. 3a and 3b are schematic views illustrating a state in which the received character message is displayed on a screen of a display unit of the TV phone according to a preferred embodiment of the present invention.

The OSD 34 then generates a character video signal corresponding to the character generating control signal CD input from the MSP 30 and outputs the character video signal to the MUX 36. When SEL-M is in the "high" state, at the appropriate time MUX 36 switches its output to display unit between (1) the decoded composite video signal input at terminals A1–A3 and (2) the character video signal outputted from the OSD 34. Thus, the character video signal output by MUX 36 to the display unit 40 allows the received message to be displayed at the bottom portion i.e., a character displaying region, of the TV image as shown in FIG. 3a. The MUX 36 is switched in this manner at the appropriate time by the MSP 30 based on the character-superimposing signal received.

Figure 3B:
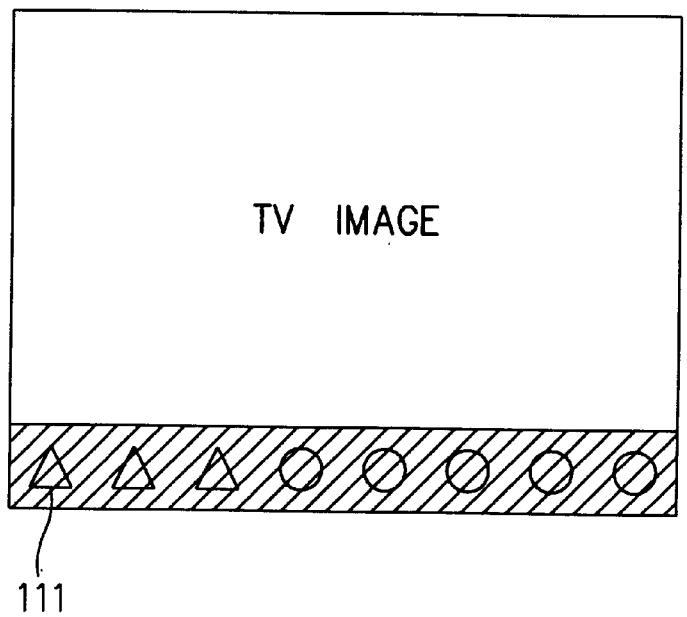

The MSP 30 determines whether or not a scroll key on the keypad 32 is selected (step 112). The term "scroll key" includes both a down scroll key allowing for reading previous portions of the character message and an up scroll key allowing for displaying later portions of the character message. If the scroll key is determined to be selected at step 112, the MSP 30 pages-up or pages-down the received character message and the program goes back to step 106 where the above mentioned process following step 106 is repeated. The term "pages-up or pages-down" means upward or downward movement of the received message displayed at the character displaying region on a screen of a TFT-LCD 46 of the display unit 40 (as shown in FIGS. 3a and 3b) in response to input of an up-scroll selecting signal or a down-scroll selecting signal generated from the up-scroll key or the down-scroll key by manipulation of the scroll key. Thus, where the received character message is long, a user can read the received character message by displaying it in a scrolling manner, at the bottom portion, i.e., the character displaying region of a screen of TFT-LCD 46.

If the scroll key is determined to not be selected at step 112, the program proceeds to step 116, where the MSP 30 determines whether or not an end key is selected by checking an output signal of the key pad 32. If it is determined at step 116 that the end key is not selected, the program returns to step 106, where the above mentioned process following step 106 is repeated, thereby continuing display of the character message at the character displaying region of the screen of the TFT-LCD 46. If it is determined at step 116 that the user has selected the end key, the program proceeds to step 118 at which the MSP 30 supplies the MUX 36 with the video selection signal SEL-M of a logic "low" state to allow only the TV image outputted from the NTSC decoder 26 to be displayed on the screen of the TFT-LCD 46 of the display unit 40. Accordingly, the received character message is no longer displayed at the character-displaying region on the screen.

While the description in the above embodiment includes the TV unit 18 that outputs R, G, and B video signal, the display unit 40 that converts the analog video signals into digital video signals and displays the converted signal, and the multiplexer 36 that selectively transmits TV video signals and the video signal of the OSD to the display unit, the above structural elements can be replaced with other elements that perform the same functions by a person skilled in the art.

For example, the TV unit may alternatively output analog complex video signals and complex synchronizing signals. The display unit may be constructed with an LCD drive and a TFT-LCD that displays images using the complex video signals and complex synchronizing signal from the TV unit. The image of the OSD can similarly be displayed using a video memory such as a video memory or video ROM and a video memory controller (including a timing generator) that generates a complex video signal. As a result, the switching operation in the multiplexer is not necessary and the time for displaying the image of the OSD can be reduced.

In addition, using a video memory and video memory controller as described immediately above, the image of the OSD can be displayed at desired position on the display unit without the character superimposing signal generator 28 shown in FIG. 1. Where the display of the OSD is controlled as described immediately above, the character message of the OSD can be displayed without activation of the image-superimposing signal.

As apparent from the above description, the TV phone of the present invention provides an advantage in the case of a character message received when a user is watching a TV program in a TV mode. The received character message is automatically displayed, in a scrolling manner, at the bottom portion screen of the TV phone, thereby allowing for free transmission/reception of any character message without interfering with a user's viewing of a TV program and with the necessity of switching of the TV mode to a phone mode being obviated.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method of controlling an operation mode of a TV phone, where the TV phone includes a TV unit that reproduces and outputs a video signal from a selected channel, a display unit interfacing with said TV unit that displays an inputted video signal while in a TV mode, a MRFU mobile radio frequency unit that receives data of a forward channel transmitted from a base station, a MSP mobile station processor that provides a channel selection signal to said TV unit and transmits and receives voice and character signals by controlling said MRFU and generates a display control signal responsive to an incoming character message, an OSD on screen display that generates a video signal corresponding to the display control signal received at an input of said OSD and provides said generated video signal to said display unit, the method of controlling the operation mode of the TV phone comprising the steps of:

receiving a character message transmitted from the base station through the forward channel when the video signal generated by the TV unit is displayed on a screen in said display unit during the TV mode; and displaying a video signal of the OSD corresponding to the first line in the received character message on a portion of the screen of the display unit, the other portions of the screen displaying the respective portion of the video signal generated by the TV unit.

2. The method in accordance with claim 1 further comprising the step of scrolling-up or scrolling-down the received character message in response to input of an up-scroll or a down-scroll command generated from an up-scroll key or a down-scroll key arranged on a key pad to display the previous or next line, respectively, of a character message received.

3. The method in accordance with claim 1 further comprising the step of clearing the character message displayed on the screen of the display unit and displaying only present images of the TV program on the screen, the clearing of the character message displayed on the screen being in response to an output terminating signal entered on a keypad.

4. A TV phone comprising
a TV unit that reproduces and outputs a video signal from a selected channel;
an MRFU that receives data of a forward channel transmitted from a base station;
an MSP that interfaces with the MRFU and the TV unit, the MSP receiving a character message from the MRFU in a character message mode, the MSP generating a display control signal in response to the character message received, the MSP also controlling the video signal output of the TV unit;
an OSD having an input that interfaces with MSP, the OSD receiving the display control signal from the MSP, the OSD generating a video output of a portion of the character message when the TV phone is in a TV mode;
a display unit having a screen, one input of the display unit interfaces with the video signal output of the TV unit, and a second input of the display unit interfaces with the video output of the OSD, the MSP controlling the video signal output of the TV unit and the video output of the OSD to display the portion of the character message of the video output of the OSD on a sub-region of the screen and to display the respective portions of the video signal output from the TV unit on the other regions of the screen.

5. A TV phone as in claim 4, where a multiplexer has inputs of the video signal output of the TV unit and the video output of the OSD, the output of the multiplexer being input to the display unit, the multiplexer receiving input switching signals from the MSP, the input switching signals causing the multiplexer to switch its output between the video signal output of the TV unit and the video output of the OSD, the timing of the input switching signals generated by the MSP correlated to a control signal generated by the TV unit and output to the MSP, the control signal indicating the video signal of the TV unit corresponds to the sub-region of the screen where the portion of the character message is displayed, whereupon the MSP switches the multiplexer from outputting the video signal of the TV unit to outputting the video output of the OSD.

* * * * *